Dec. 15, 1936.    H. K. ALLARD    2,064,051
REVERSE GEAR FOR LOCOMOTIVES AND OTHER ENGINES
Filed June 29, 1934    4 Sheets-Sheet 1

Inventor:
Herbert K. Allard
By
Attorneys.

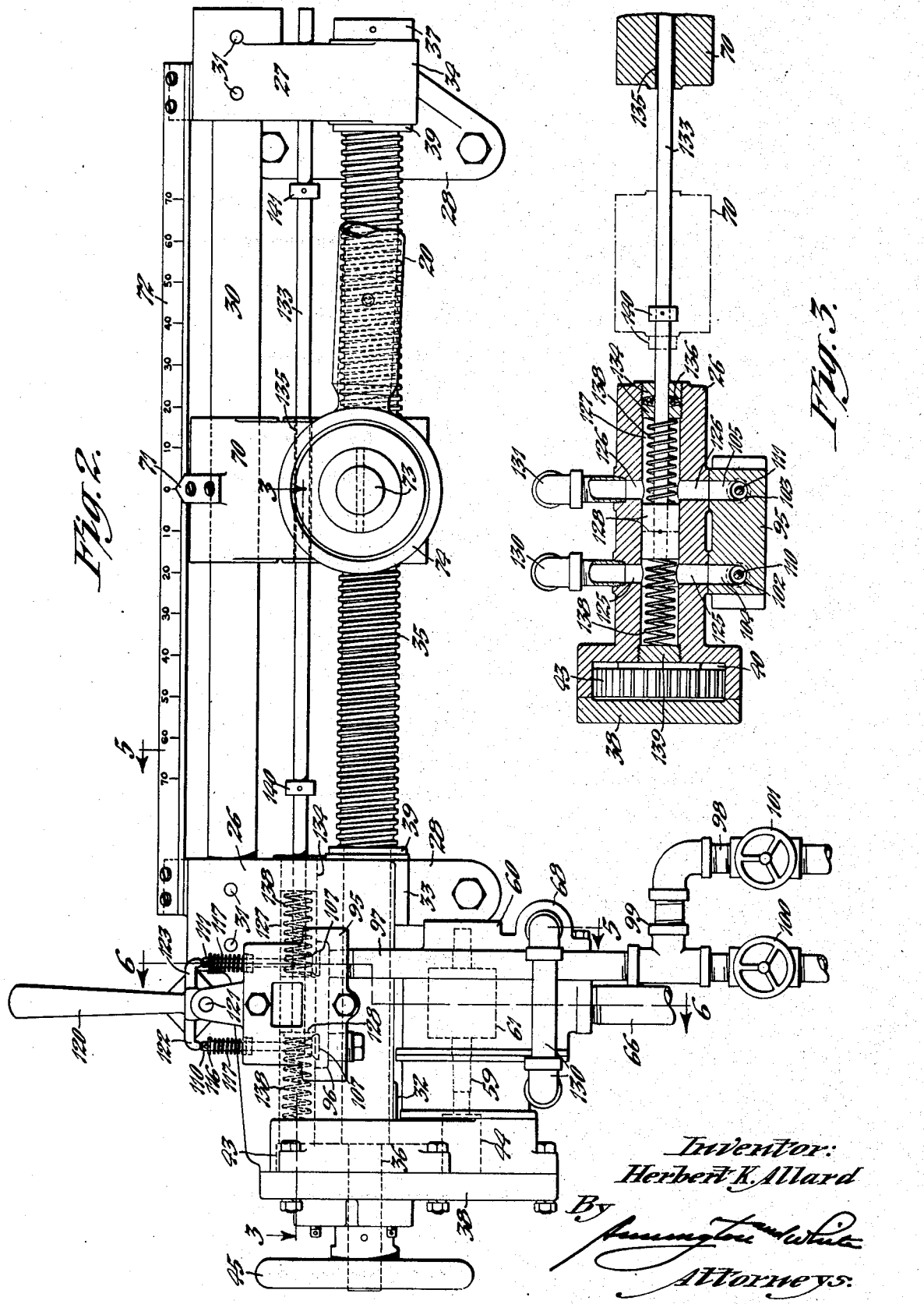

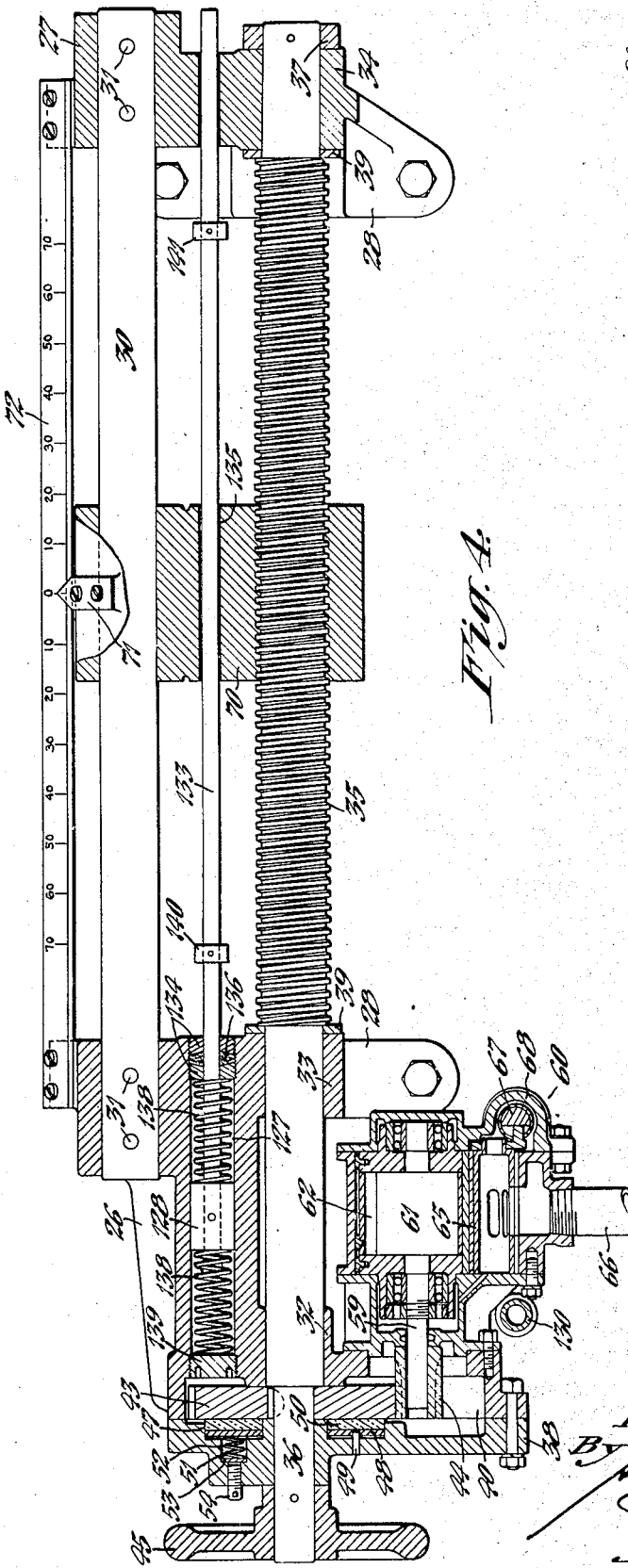
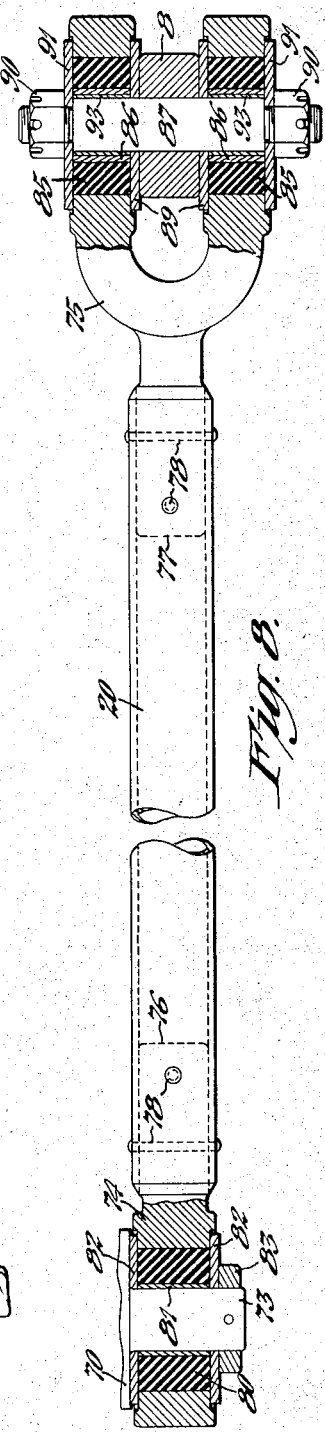

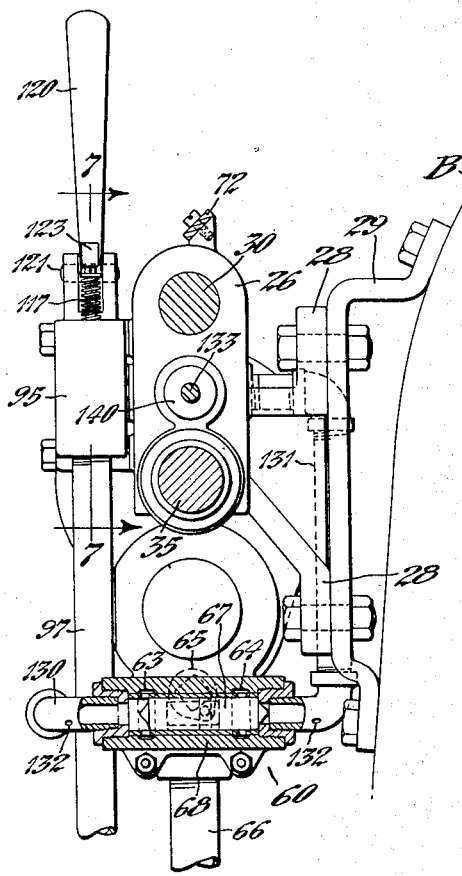

Patented Dec. 15, 1936

2,064,051

UNITED STATES PATENT OFFICE 2,064,051

REVERSE GEAR FOR LOCOMOTIVES AND OTHER ENGINES

Herbert K. Allard, Cranston, R. I.

Application June 29, 1934, Serial No. 733,098

12 Claims. (Cl. 121—162)

This invention relates to reverse-gears for controlling the valves of locomotives or other steam-engines and particularly to a device of the screw type wherein the valve-controlling mechanism is operative either manually or by power.

One object of the invention is to provide an improved reverse-gear of the type indicated which is power driven to effect quick adjustment of the valve-mechanism and one that is especially sensitive and accurate in operation to accomplish minute adjustment of the valve-gear.

Another object of the invention is to provide a reverse-gear of the type indicated which is self locking after adjustment, whereby the valve-mechanism is maintained in proper position without liability of creeping due to vibrations set up in the engine and associated parts.

Another object of the invention is to provide a reverse-gear of the type indicated which may be operated under power generated by compressed air, steam pressure or by other means such as an electric motor.

Another object of the invention is to provide a reverse-gear of the type indicated having means travelable to adjust the position of the valve-mechanism while being prevented from jamming or freezing at its extremes of travel.

Another object of the invention is to provide resilient means for connecting the reverse-gear with the valve-mechanism to prevent shock and strain liable to cause damage thereto.

Another object of the invention is to provide a reverse-gear of the type indicated which is positive in operation, durable in use and generally more efficient for the purpose intended.

Further objects of the invention are set forth in the following specification which describes a preferred form of construction of the reverse-gear, by way of example, as illustrated by the accompanying drawings. In the drawings:

Fig. 2 is a side view of the improved reverse-gear;

Fig. 3 is a sectional plan view of a portion of the device taken on line 3—3 of Fig. 2;

Fig. 4 is a longitudinal sectional view of the device taken in a medial plane;

Fig. 5 is a transverse sectional view of the motor end of the device taken on line 5—5 of Fig. 2;

Fig. 6 is a similar view taken on line 6—6 of Fig. 2;

Fig. 7 is a sectional view of the manually controlled throttle-valves of the motor taken on line 7—7 of Fig. 5; and Fig. 8 is a detailed view of the reach-rod showing the improved construction of the connections therefor.

Figure 1:
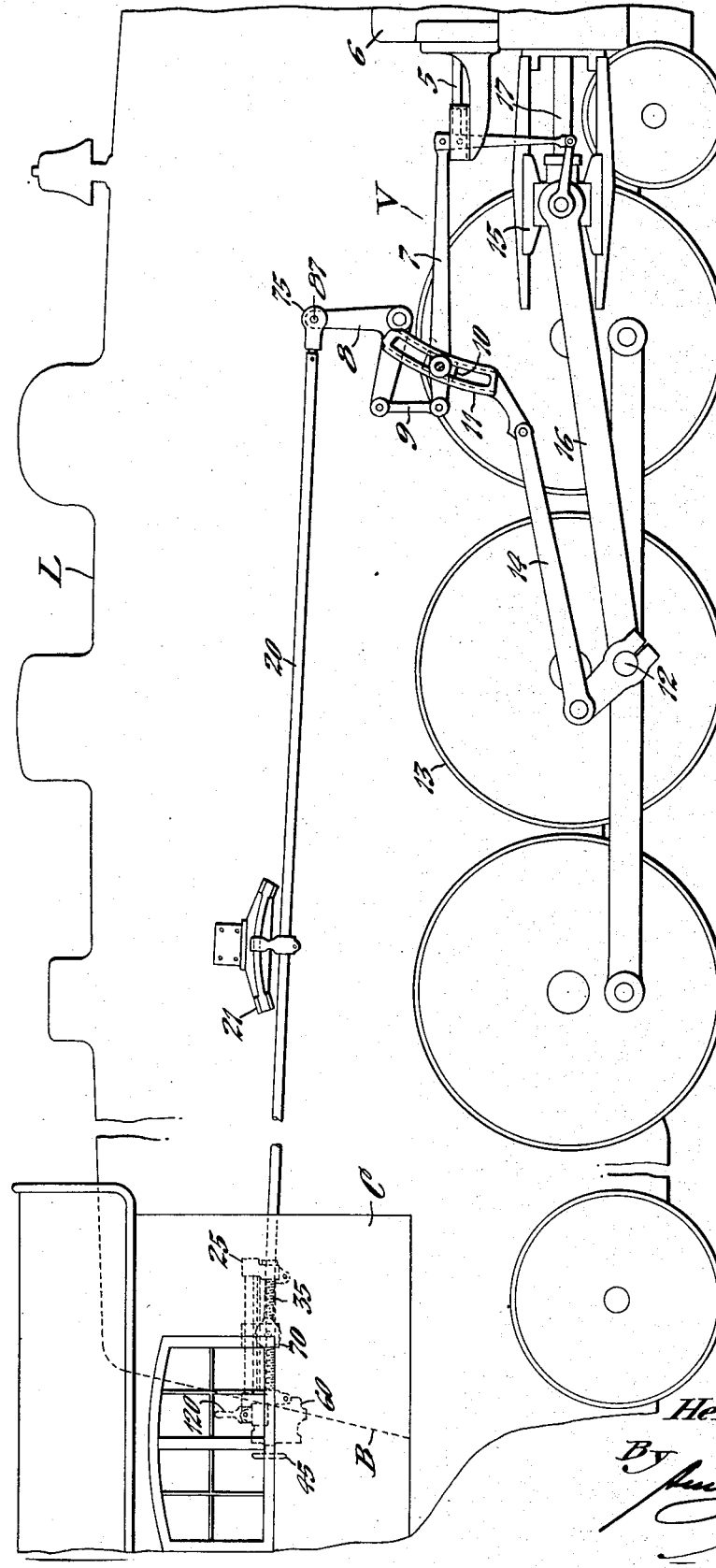
Fig. 1 is a side view, more or less diagrammatic, of a locomotive engine showing its valve-mechanism as controlled by the present improved reverse-gear.

The present improved reverse-gear comprises, in general, a screw-shaft; a crosshead engaging the screw-shaft to be traversed by the rotation thereof; a reach-rod connecting the crosshead to operate the mechanism for shifting the position of the engine steam-valves; and manually-controlled power-operated means, such as an air motor, for rotating the screw-shaft in opposite directions.

Referring first to Fig. 1 of the drawings, a portion of a locomotive L is here illustrated as equipped with a conventional type of valve-gear V controlled by the present improved power reverse-gear 25 located in the cab C. Since the reverse-gear is adaptable for use with various types of valve-mechanisms that herein shown will be described only briefly in its relation to the present invention. Suffice it to state that the valve-stem 5 for shifting the valve in the steam-chest 6 is moved longitudinally from a radius-rod 7 connected to a bell-crank or reversing lever 8 by means of a link 9. The radius-rod 7 carries a block 10 slidable in an arcuate slot in the rockable sector or link 11 which is oscillated from an eccentric crank-pin 12 on the drive-wheel 13 by means of a connecting rod 14. Power is applied to the driver 13 through the connecting rod 16 connected to the crosshead 15 which is reciprocated by the piston 17. During the turning of the drive-wheel 13 the link 11 is rocked on its pivot to impart reciprocatory movement to the radius-rod 7 and valve-stem 5 to operate the steam-valve in the manner and for the purpose as well known to those versed in the art.

The direction of travel and the speed of the locomotive is controlled by shifting the position of the engine valve in the steam-chest 6. This is accomplished by raising or lowering the radius-rod 7 with respect to the axis about which the link 11 oscillates. When the block 10 is raised above the axis of the link 11 the valve operates the engine to drive the locomotive forward; and when lowered below the axis of the link the direction of drive is reversed. As is the usual arrangement, the degree of movement of the block 10 away from the axis of the link 7 determines the running speed.

Connected to the vertical arm of the bell-crank or reversing lever 8 is a reach-rod 20 which extends rearwardly for connection with the reverse-gear in the manner as later explained. Midway of its length the reach-rod 20 is slidably supported from a suitable bracket 21 secured to the side of the locomotive.

Referring now to Fig. 2 of the drawings, the present reverse-gear mechanism is supported by a housing 26 and bracket 27 having feet 28 attached to the side of the boiler B of the locomotive by means of a U-shaped bracket 29, see Fig. 5. The reverse-gear may be positioned within the cab C as herein shown or forward thereof, as desired. The housing 26 and bracket 27 are connected by a tie-rod 30 passing through bores therein and secured in place by pins 31. Journaled in spaced bearings 32 and 33 in the housing 26 and in a bearing 34 on the bracket 27 is a threaded shaft or traverse-screw 35. A collar 37 pinned to the forward end of the screw-shaft 35 and washers 39 abutting shoulders on the shaft and the inner ends of the bearings 33 and 34 take the axial thrust. The screw-shaft 35 has a reduced portion 36 projecting from the rearward bearing 32 with its end journaled in the bore of a cover member 38 bolted to the end of the housing 26.

The housing 26 is provided with a chamber 40 enclosing a spur-gear 43 keyed to the reduced end 36 of the screw-shaft 35. The gear 43 meshes with a pinion-gear 44 carried fast on the end of the rotor-shaft 59 of an air motor, indicated at 60 in the drawings and later described, which is bolted to the opposite side of the housing 26 below the screw-shaft 35, see Fig. 4. Pinned to the projecting portion 36 of the screw-shaft 35 abutting the side of the cover 38 is a handwheel 45 by means of which the shaft may be manually rotated.

As shown in Fig. 4, the inner face of the housing cover 38 is formed with an annular groove 47 arranged concentric of the axis of the shaft 35 and serving to support a relatively thin disk or ring 48. The ring 48 is restrained from turning in the groove 47 by pins 49 projecting through the cover 38 and engaging holes in the ring. Also slidably arranged within the groove 47 between the ring 48 and the outer face of the spur-gear 43 is a friction ring or brake-annulus 50 constructed from suitable material such as compressed asbestos, fiber, canvas or the like. The brake-ring 50 is urged against the gear 43 under the tension of a plurality of helical springs 51 pocketed in recesses 52 formed in the cover 38 and opening into the groove 47. At the closed ends of the recesses 52 are disks 53 against which the springs 51 bear. For regulating the pressure of the brake-ring 50 against the gear 43, studs 54 screwed through threaded holes in the cover 38 are set up against the disks 53 to adjust the tension of the springs 51.

It has been stated that the valve-mechanism of the locomotive is adjusted from the reverse-gear 25 and the means for connecting the two mechanisms is next described. Slidably mounted on the tie-rod 30 extending between the brackets 26 and 27 is a crosshead 70 having a screw-threaded bore engageable with the threads of the screw-shaft 35. The crosshead 70 is traversed in one direction or the other by the screw-shaft 35, depending upon the direction of rotation of the shaft. The crosshead 70 carries a pointer 71 which overlies a graduated scale 72 fastened to the top of the housing 26 and bracket 27, whereby the position of the valve-gear may be readily and accurately determined. The crosshead 70 is connected to the bell-crank or reversing lever 8 of the engine by the reach-rod 20, previously mentioned, and means are provided for cushioning the thrust and absorbing the shock and vibration at the ends of the reach-rod.

Referring to Figs. 2 and 8, the crosshead 70 is formed with an integral stud 73 projecting from its side, to which one end of the reach-rod 20 is pivotally connected. The reach-rod 20 may be of tubular construction with heads or terminal bearing members 74 and 75 attached to its ends. As herein shown the bearing members 74 and 75 are provided with cylindrical shanks 76 and 77 received in the ends of the rod 20 and secured thereto by cross-pins 78. The hub or bearing portion of the member 74 is bored to receive a resilient bushing 80, preferably constructed of specially treated rubber. Lining the bushing 80 is a metal sleeve 81 adapted to receive the stud 73 on the crosshead 70. A pair of washers 82 abut the sides of the head or bearing 74 and a collar 83 pinned to the extremity of the stud 73 holds the reach-rod 20 in place thereon.

The head or bearing 75 at the opposite end of the reach-rod 20 is of bifurcated form with opposite alining hubs adapted to straddle the vertical arm of the reverse-lever 8 for the valve-mechanism V. Each hub of the forked head 75 is provided with a resilient bushing 85 and a metal lining sleeve 86 for receiving the ends of a stud 87 held fast in the upper end of the lever 8. Washers 89 abut the sides of the hubs of the head or bearing 75 and castellated nuts 90 screwed onto the ends of the stud 87 against washers 91 retain the several parts in place. The swiveling action at the forward end of the reach-rod 20 is considerably greater than at the reverse-gear end, and to reduce the wear at this point separate sleeves 93, constructed from special metal alloy, are interposed between the lining sleeves 86 and the stud 87. By this construction a metal-to-metal bearing contact which requires no lubrication is effected, thus avoiding the detrimental effect of oil on the rubber bushings 85. The resilient connections at the ends of the reach-rod 20 constitute means for absorbing shock and jar set up by vibrations in the engine, thus preventing wear and deterioration in the parts of the reverse-gear.

As before indicated, the means for rotating the screw-shaft 35 may consist of any suitable power device. Motors of various types may be employed driven by steam or electricity, the rotary air motor 60 being herein illustrated merely as an example of one practical source of power. The motor 60 herein shown is of standard construction and therefore will not be described in detail. Suffice it to state that the rotor 61 of the motor 60 carries vanes 62 by which it is revolved within a housing under pneumatic pressure introduced through suitable ducts 63 and 64 and exhausted through a sleeve-valve 65 and pipe 66 leading to the atmosphere. The admission of compressed air through the inlet duct 63 or 64 is controlled by a slide-valve 67 in a cylindrical chamber 68 at the end of the motor housing, see Fig. 5. The slide-valve 67 is actuated by the pressure of the fluid as it is admitted to either one or the other of the inlet ducts 63 and 64. The longitudinal movement of the slide valve 67 rotates the sleeve-valve 65 through a crank-arm on the sleeve-valve having a pin engaging a slot on the slide-valve as shown in Figs. 4 and 5. In this manner the sleeve-valve is automatically actuated to connect the exhaust pipe 66 with the opposite side of the motor from that to which compressed air is admitted. The ingress of air to either end of the chamber 68 is controlled from a manually-operated throttle-valve of the poppet type, to be later described, whereby the direction of rotation of the rotor 61 is determined to effect the desired rotative direction of the screw-shaft 35 from the gears 44 and 43.

The manual control for the motor 60, and thereby for the reverse-gear 25, is constructed and arranged as next described. Bolted to the side of the housing 26 is a valve-casing 95 having a compartment 96 at the bottom with a pressure inlet-pipe 97 communicating therewith, see Fig. 7. Pressure is supplied through the pipe 97 from the compressed air tank of the locomotive or from any other source. As shown in Fig. 2, a steam-inlet pipe 98 may be joined at 99 to the air pipe 97 with valves 100 and 101 provided in the lines to selectively admit either air or steam to the compartment 96 in accordance with the preferred method of supplying pressure to the motor. In most cases the reverse-gear is operated under pneumatic pressure, but the steam connection is provided as a safety precaution should the air supply fail.

At the ends of the valve-casing 95 are vertically disposed ducts 102 and 103 opening into the compartment 96, see Fig. 7. Leading through the rearward side of the casing 95 and into the ducts 102 and 103 are transverse ducts or passages 104 and 105. The lower ends of the ducts 102 and 103 are formed with beveled seats 106 for the beveled heads 107 of poppet-valves 110 and 111. The stems of the valves 110 and 111 are slidable in vertical bores 112 axially alined with the ducts 102 and 103 in the casing 95. The ends of the bores 112 are counterbored at 113 to receive suitable packing gaskets 114 held under compression therein by glands 115. Surrounding the valve-stems 110 and 111 above the casing 95 and held under compression between the glands 115 and washers 116 secured to the ends of the stems are helical springs 117. The springs 117 normally maintain the valves 110 and 111 with their heads 107 closed against the seats 106 in the casing 95. The valves 110 and 111 are adapted to be opened against the action of the springs 117 by means of a rockable hand-lever 120 pivoted at 121 to an upstanding projection on the casing 95. The lever 120 has laterally extending arms 122 and 123 overlying the ends of the valve-stems 110 and 111 to act thereon in the manner and for the purpose as later explained.

Referring now to Fig. 3, the housing 26 is provided with two transverse passages 125 and 126 which aline with the ducts 104 and 105, and intersecting these passages is a longitudinally extending bore 127. Slidable in the bore 127 is a cylindrical valve-closure 128 connected to be shifted by the crosshead 70 in the manner as later explained to close the passages 125 and 126. As shown in Figs. 2, 3, 5 and 6, the inner ends of the passages 125 and 126 are connected to the front and rearward ends, respectively, of the air inlet-chamber 68 of the motor 60 by means of pipes 130 and 131. The pipes 130 and 131 may be provided with small bleeder vents 132, see Fig. 5, for relieving the pressure when the valves 110 and 111 are being closed.

The sliding closure 128 in the bore 127 is fast on the end of a rod 133, see Figs. 2, 3 and 4, slidable in a bore in the outboard bracket 27 and in a pair of bushings 134 screwed into a threaded hole at the forward end of the housing 26. The rod 133 passes freely through a hole 135 in the crosshead 70. Between the bushings 134 is a packing ring 136 for preventing leakage around the rod 133. Surrounding the rod 133 between the closure 128 and the inner bushing 134 is a helical spring 138; and a similar spring 138 is held in the bore 127 between the opposite end of the closure 128 and a plug 139 screwed into the threaded end of the bore. The springs 138, being of equal length and tension, normally maintain the valve-closure 128 balanced between the passages 125 and 126 to permit the flow of air through either passage. The rod 133 is shifted axially to effect closing of one or the other of ports 125 or 126 as the crosshead 70 comes into engagement with one of two collars 140 and 141 pinned to the rod at points adjacent the housing 26 and bracket 27. It is to be noted that the shut-off valve last described is located in the air line between the manually-operated control lines and the motor to arrest the turning of the screw-shaft as the crosshead reaches its ends of traverse. The method of operation of the complete apparatus is as next explained.

It will be understood that the valve-gear V illustrated in Fig. 1 of the drawings is duplicated on the opposite side of the locomotive for control of the steam-valve there located. Both valve-mechanisms are operated from the single reverse-gear described, the tumbler-shaft carrying the bell-crank 8 being extended across to carry a similar reversing lever for the opposite steam-valve. With the locomotive at rest the throttle-valve of the engine is closed and the crosshead 70 of the reverse-gear 25 is usually adjusted in mid position on the screw 35, as shown in Fig. 2, with its indicator-finger 71 at zero on the scale 72. At this juncture the control lever 120 stands erect with both valves 110 and 111 closed or seated by their springs 117. The valve-closure 128 also remains in neutral position midway between the passages 125 and 126 leading to the air motor.

To provide for driving the locomotive forward the lever 120 is rocked forwardly to open the valve 111, whereby to admit pressure through the duct 105 to the passage 126 which leads through pipe 131 and port 64, see Fig. 5. The port 64 communicates with the casing of the air motor in such location that the rotor 60 is caused to rotate in the direction indicated by the arrow in Fig. 6. Rotation of the rotor 60 in this direction turns the pinion 44 to drive the gear 43 on the screw-shaft 35 in clockwise direction, as viewed from the forward end of the device. The screw-shaft 35, being formed with right-hand threads, is thus caused to traverse the crosshead 70 forwardly or towards the bracket 27.

As the crosshead 70 is thus traversed to slide the reach-rod 20 forwardly it rocks the bell-crank 8 in a clockwise direction as viewed in Fig. 1. This motion of the bell-crank 8 raises the end of the radius-rod 7, thereby shifting its block 10 upwardly on the link 11 to slide the valve-stem 5 forwardly to open the steam-valve; it being understood that the same action takes place in the valve-mechanism on the opposite side of the locomotive. In the meantime the throttle-valve is opened by the engineer to admit pressure to the engine cylinders to cause the pistons 17 to reciprocate the crossheads 15 to turn the drive-wheels to propel the locomotive ahead.

The engineer watches the indicator 71 as it slides along the scale 72 and when the crosshead 70 is traveled to the desired position to effect the proper cut-off of the steam-valves the lever 120 is released, whereupon it will be returned to erect or neutral position as shown in Figs. 1 and 2. As the lever 120 is released the valve 111 is closed under the action of its spring 117 to cut off the pressure to the rotor 61 whereby to arrest the turning of the screw-shaft 35. The screw-shaft 35 is turned against the braking pressure of the friction annulus 50, shown in Fig. 4 of the drawings, and upon arrestment of its motion the brake-ring acts to prevent unwarranted movement of the screw-shaft due to any cause such as vibration.

Normally, due to the relatively slight angle of the screw-thread on the shaft 35 there is little tendency to cause longitudinal movement or creeping of the crosshead 70 on the screw; and due to the added precaution of the braking means last described such creeping is positively prevented. Moreover, vibrations set up in the valve-gear and other parts of the locomotive are absorbed by the rubber mountings 80 and 85 at the ends of the reach-rod 20 so that the effect of shock and jar is minimized to further render the device more accurate and permanent in the adjustment of the valve-gear.

To reverse the travel of the locomotive the hand lever 120 is rocked rearwardly as indicated in Fig. 7 of the drawings to open the valve 110. The opening of the valve 110 admits pressure through the port 102 and duct 104 connecting with the passage 125, see Fig. 3, and thereby pressure is admitted to the air motor through the port 63 whereby to cause the rotor 61 to be turned in a clockwise direction as viewed in Fig. 6. The rotor 61 thereby turns the pinion 44 to drive the gear 43 in a contraclockwise direction so that the screw-shaft 35 is rotated to traverse the crosshead 70 rearwardly. Under this movement of the crosshead 70 the reach-rod 20 is drawn back to rock the bell-crank levers 8 to slide the radius-rods 7 downwardly on the links 11. This movement of the radius-rods draws the valve-stems 5 outwardly from the steam-chests 6 to set the valves to propel the locomotive rearwardly; the action being the reverse of that previously described in starting the locomotive forward.

With the locomotive being propelled in either direction its travel is arrested through the operation of the throttle-valve in the usual manner to shut off the supply of steam to the valves in the steam-chests 6. If desired the crosshead 70 of the reverse-gear may then be adjusted to neutral or zero position. This is accomplished by moving the lever 120 in such direction as to turn the screw 35 to propel the crosshead 70 from its forward or rearward position, whichever it may be, back into mid position on the screw 35, the pointer 71 being watched to determine when it reaches the zero mark on the scale 72.

As before indicated, the purpose of the valve-closure 128 is to guard against jamming or "freezing" of the crosshead 70 at the ends of the screw-shaft 35. As the crosshead reaches either extreme of its traverse by the turning of the screw 35 it comes into engagement with one or the other of the collars 140 and 141 to slide the rod 133 to actuate the valve-closure 128. Referring to Fig. 3, when the crosshead 70 is traversed rearwardly toward the housing 26 it engages the collar 140 to slide the rod 133 in the same direction and thereby move the closure 128 across the air passage 125, as indicated in dot-and-dash lines in Fig. 3, to shut off the pressure at this point. The air passage 125 is open during the operation of the valve-gear by the manually-operated lever 120 to reverse the locomotive and thus at the end of the stroke of the crosshead 70, which accomplishes the reverse, pressure to the motor is shut off by the valve-closure 128 to prevent the crosshead from jamming against the bearing 33. In other words, whichever the direction of the crosshead 70 the valve-closure 128 is operated automatically at the end of its stroke to shut off the pressure to the motor to arrest the turning of the screw-shaft 35 before the crosshead brings up against the end bearing for the shaft. In this manner the valve-gear is protected from damage which might result from uncontrolled operation of the motor and the crosshead is prevented from freezing against the end bearings to interfere with its reverse motion.

It will be observed from the foregoing that the present invention provides a simple yet highly efficient reverse-gear for adjusting the valve-mechanisms of steam engines. The sliding crosshead which shifts the valve-gear may be operated from any source of power such as air, steam pressure or other mechanical equivalents. In case of failure of the air, steam pressure or electric current, means are provided in the handwheel 45 for turning the screw-shaft 35 to adjust the valve-gear manually.

The single thread traverse-screw provides for adjustment of the position of the crosshead with micrometer precision and the position of the valves is thereby determined with equal accuracy. The single thread form of the screw also tends to resist its turning under stress on the crosshead and the friction braking means serve as a further precaution against accidental or unwarranted displacement of the crosshead and change in the setting of the valves. Adequate provision is thus made against creeping of the crosshead whereby an accurate and permanent cut-off of the steam-valves is secured in whatever position the valve-gear is set. This results in a substantial saving of fuel and relieves the engineer from constantly watching the device and altering its adjustment.

The present improved valve-gear is of sturdy construction and proof against damage by jamming of its parts in normal operation or injury from stress and strain set up by vibration.

The device is adapted for attachment to locomotives of various types already in use and requires practically no change in the structure and arrangement of the engine itself.

While the device is herein shown and described as embodied in a preferred form of construction, by way of example, it is to be understood that various modifications may be made in the structure and arrangement of its parts without departing from the spirit or scope of the invention. Therefore, without limiting myself in this respect, I claim:

1. In a reverse-gear for locomotives and other engines, the combination of engine valve-mechanism, a rotary motor, a screw-shaft driven by the motor, a traversing member on the shaft actuated by the rotation of the shaft in either direction, means for controlling the operation of the motor, means connected to said traversing member for adjusting the engine valve-mechanism, and a friction brake embodied in the reverse-gear and acting to hold the screw-shaft against rotation caused by the small component of the vibrational force of the engine valve-mechanism applied axially against the inclined threads of the screw-shaft by the traversing member.

2. In a reverse-gear for locomotives and other engines, engine valve-gear, a rotary motor, a screw-shaft driven by the motor, a crosshead on the screw-shaft, a reach-rod having bearings at opposite ends for connecting the crosshead and engine valve-gear, and means for eliminating creep in the valve-gear while permitting vibration of the valve-gear comprising resilient cushions surrounding the bearings on the reach-rod at their point of connection with the crosshead and engine valve-gear to absorb and reduce vibration, and a friction brake embodied in the reverse-gear and acting to hold the screw-shaft against rotation caused by the small component of the vibrational force of the engine valve-gear applied axially against the inclined threads of the screw-shaft by the traversing member.

3. In a reverse-gear for locomotives and other engines, engine valve-gear, a screw-shaft, a crosshead on the screw-shaft movable longitudinally by rotation of the screw-shaft, means for rotating the screw-shaft, a reach-rod connecting the crosshead and engine valve-gear, resilient means between the reach-rod and parts to which it is connected, said resilient means permitting vibration of the engine valve-gear without creating forces which would prevent vibration, and a friction brake applied to the screw-shaft to prevent it from being rotated by forces applied to the crosshead through the reach-rod whereby creep in the reverse-gear is prevented.

4. In a reverse-gear for locomotives and other engines, engine valve-gear, a rotary motor, a screw-shaft, reduction gearing connecting the motor and screw-shaft including a gear on the end of the shaft, a crosshead actuated longitudinally by the rotation of the screw-shaft, a reach-rod connecting the crosshead and engine valve-gear, resilient means between the reach-rod and parts to which it is connected for absorbing vibration, and a friction disk engaging the side of the gear on the end of the screw-shaft for holding the latter in adjusted position to prevent creep.

5. In a reverse-gear for locomotives and other engines, engine valve-gear, a fixed housing, a rotary fluid motor in the housing, a frame on the housing, a screw-shaft journaled in the frame, reduction gearing connecting the motor and screw-shaft including a gear on the end of the latter, a crosshead in the frame traversed longitudinally thereof by rotation of the screw-shaft, a reach-rod connecting the crosshead and engine valve-gear, rubber bushings acting between the reach-rod and parts to which it is connected to absorb and reduce the vibration tending to rotate the screw-shaft, and a friction disk acting between the fixed housing and gear at the end of the screw-shaft for holding the latter against rotation whereby to prevent creep in the reverse-gear.

6. In a reverse-gear for locomotives and other engines, engine valve-mechanism, and mechanism for operating the valve-mechanism comprising a housing, a frame extending from the housing, a rotary screw-shaft supported for rotation in the housing and frame, a crosshead on the screw-shaft, a reach-rod connecting the crosshead and engine valve-mechanism, a gear within the housing fixed to the shaft, a motor for driving the gear, and a friction disk engaging the end of the gear for holding the screw-shaft in any adjusted position.

7. In a reverse-gear for locomotives and other engines, engine valve-mechanism; mechanism for operating the valve-mechanism comprising a screw-shaft, a traversing member operated by the screw-shaft, a reach-rod connecting the traversing member and valve-mechanism; and a brake for holding the screw-shaft in any adjusted position comprising a gear fixed to the screw-shaft, a housing for the screw-shaft and gear having an annular recess, an annular friction disk within the recess and engaging the side of the gear, resilient means for holding the disk against the gear with friction, and means for adjusting the resilient means to vary the friction between the disk and gear.

8. In a reverse-gear for locomotives and other engines, engine valve-gear, a screw-shaft, a traversing member actuated in opposite directions by rotation of the screw-shaft, a reach-rod resiliently connected at opposite ends to the traversing member and engine valve-gear respectively, a motor for driving the screw-shaft to move the traversing member in opposite directions, valve-means for controlling the motor, a second valve-means for stopping the motor, means actuated by the traversing member at the end of its movement in either direction to operate the second valve-means to stop the motor, and a brake within the reverse-gear for holding the latter in any adjusted position after the motor has come to rest.

9. In a reverse-gear for locomotives, the combination of engine valve-gear, a fluid-actuated rotary motor, a screw-shaft driven by the motor, a traversing member actuated in opposite directions by the rotation of the screw-shaft, a reach-rod directly connecting the traversing member and valve-gear, conduits for supplying a motive fluid to either side of the motor, manually-actuated valve-means for controlling the flow of motive fluid to either one or the other of the conduits, means for exhausting the fluid from the motor, and a second valve-means normally positioned between the conduits and automatically operated by the traversing member at the end of its stroke in either direction for closing the conduit opened to the flow of motive fluid by the manually-actuated valve-means whereby to stop the motor.

10. In a reverse-gear for locomotives and other engines, engine valve-mechanism, a housing, a frame extending from the housing, a screw-shaft supported for rotation in the housing and frame, a motor within the housing for driving the screw-shaft and having means for exhausting fluid fed thereto, a crosshead mounted on the screw-shaft for longitudinal movement in the frame, a reach-rod between the crosshead and engine valve-mechanism, means for supplying fluid to either side of the motor including two conduits in the housing, valve-means for controlling the supply of fluid to the conduits, a second valve-means within the housing normally positioned between the two conduits, a rod for operating the second-mentioned valve-means positioned closely adjacent the crosshead, and stops on the rod engaged by the crosshead for moving the valve-means to close one or the other of the conduits.

11. In a reverse-gear for locomotives, the combination of engine valve-gear, a fluid motor, means for actuating the valve-gear from the motor, and means for controlling the motor comprising a casing having a chamber for containing a motive fluid under pressure, conduits leading from the chamber to opposite sides of the motor, a poppet-valve in each conduit for controlling the supply of fluid to either side of the motor, a manual actuator for selectively actuating either one or the other of the poppet-valves, and a piston-valve normally positioned between the conduits and so constructed and arranged as to be operated by the actuating means for the valve-gear to close the conduit opened by the manual actuator to stop the motor at predetermined limits of movement of the engine valve-gear.

12. In a control device for a fluid motor, a casing having a chamber for containing a fluid under pressure, conduits in the casing extending from opposite sides of the motor to the chamber and terminating in valve-ports, valves in the chamber cooperating with the ports, a manual actuator for selectively actuating either one or the other of the valves, and a third valve within the casing positioned between the conduits and adapted to be moved to a position to shut off the flow in either of the conduits.

HERBERT K. ALLARD.